United States Patent
Xin et al.

(10) Patent No.: US 12,436,535 B2
(45) Date of Patent: Oct. 7, 2025

(54) SUSPENDED LOAD DETECTION FOR AUTONOMOUS VEHICLES

(71) Applicant: Venti Technologies, Singapore (SG)

(72) Inventors: Sun Xin, Singapore (SG); Mahdi Abolfazli Esfahani, Singapore (SG); Xinxin Du, Singapore (SG)

(73) Assignee: Venti Technologies, Singapore (SG)

( * ) Notice: Subject to any disclaimer, the term of this patent is extended or adjusted under 35 U.S.C. 154(b) by 130 days.

(21) Appl. No.: 18/491,121

(22) Filed: Oct. 20, 2023

(65) Prior Publication Data
US 2024/0134379 A1 Apr. 25, 2024
US 2024/0231361 A9 Jul. 11, 2024

(30) Foreign Application Priority Data

Oct. 20, 2022 (SG) .............................. 10202251451E

(51) Int. Cl.
*G05D 1/00* (2024.01)
*G01S 17/89* (2020.01)
(Continued)

(52) U.S. Cl.
CPC ............ *G05D 1/0225* (2013.01); *G01S 17/89* (2013.01); *G05D 1/0248* (2013.01); *G05D 1/247* (2024.01); *G05D 1/661* (2024.01)

(58) Field of Classification Search
CPC ...... G05D 1/0225; G05D 1/661; G05D 1/247; G05D 1/0248; G01S 17/89
See application file for complete search history.

(56) References Cited

U.S. PATENT DOCUMENTS

2008/0186470 A1* 8/2008 Hipp ..................... G01S 7/4815
356/5.08
2019/0180467 A1  6/2019 Li et al.
(Continued)

FOREIGN PATENT DOCUMENTS

CN  114890280  8/2022
CN  114995387  9/2022

OTHER PUBLICATIONS

Patent Cooperation Treaty, PCT/SG2023/050703, International Preliminary Report on Patentability, Mar. 1, 2025.
(Continued)

*Primary Examiner* — Hunter B Lonsberry
(74) *Attorney, Agent, or Firm* — Jones Day

(57) ABSTRACT

Systems, methods, and computer programmable products are described herein for detecting a suspended load by an autonomous vehicle maneuvering about an environment. A scanning device mounted on and perpendicular to a top surface of the autonomous vehicle receives a plurality of data points surrounding the autonomous vehicle. A point detection module detects whether an object is present within a detection range of the autonomous vehicle by: clustering subsets of the plurality of data points and determining whether at least one clustered subset of the plurality of data points is within the detection range. Based on the object being present within the detection range, at least three features are extracted from the object to detect whether the object is a suspended load. The maneuvering of the autonomous vehicle is controlled based on detection of the suspended load.

23 Claims, 13 Drawing Sheets

(51) Int. Cl.
     *G05D 1/247*       (2024.01)
     *G05D 1/661*       (2024.01)

(56) References Cited

U.S. PATENT DOCUMENTS

2021/0256718 A1     8/2021   Gangundi et al.
2022/0363521 A1*   11/2022   Oren ..................... B66C 13/16

OTHER PUBLICATIONS

Patent Cooperation Treaty, PCT/SG2023/050703, International Search Report and Written Opinion, Feb. 13, 2024.
Intellectual Property Office of Singapore, Appl. 10202251451E, Search Report and Written Opinion, Jul. 30, 2025.

* cited by examiner

SUSPENDED LOAD DETECTION FOR AUTONOMOUS VEHICLES

PRIORITY CLAIM

The present application claims priority to Singapore Application No. 10202251451E, filed Oct. 20, 2022, the contents of which is incorporated by reference herein in its entirety.

TECHNICAL FIELD

The subject matter described herein relates to detecting of suspended loads for autonomous vehicles.

BACKGROUND

Automation is the use of computing systems to accomplish various tasks without the need of human intervention. Various industries utilize automation to complete tasks, for example, to reduce costs and/or improve efficiency. Example industries that use such automation include the automotive industry and shipping industry.

BRIEF DESCRIPTION OF THE DRAWINGS

Aspects of the present disclosure are best understood from the following detailed description when read with the accompanying figures.

SUMMARY

Figure 1:
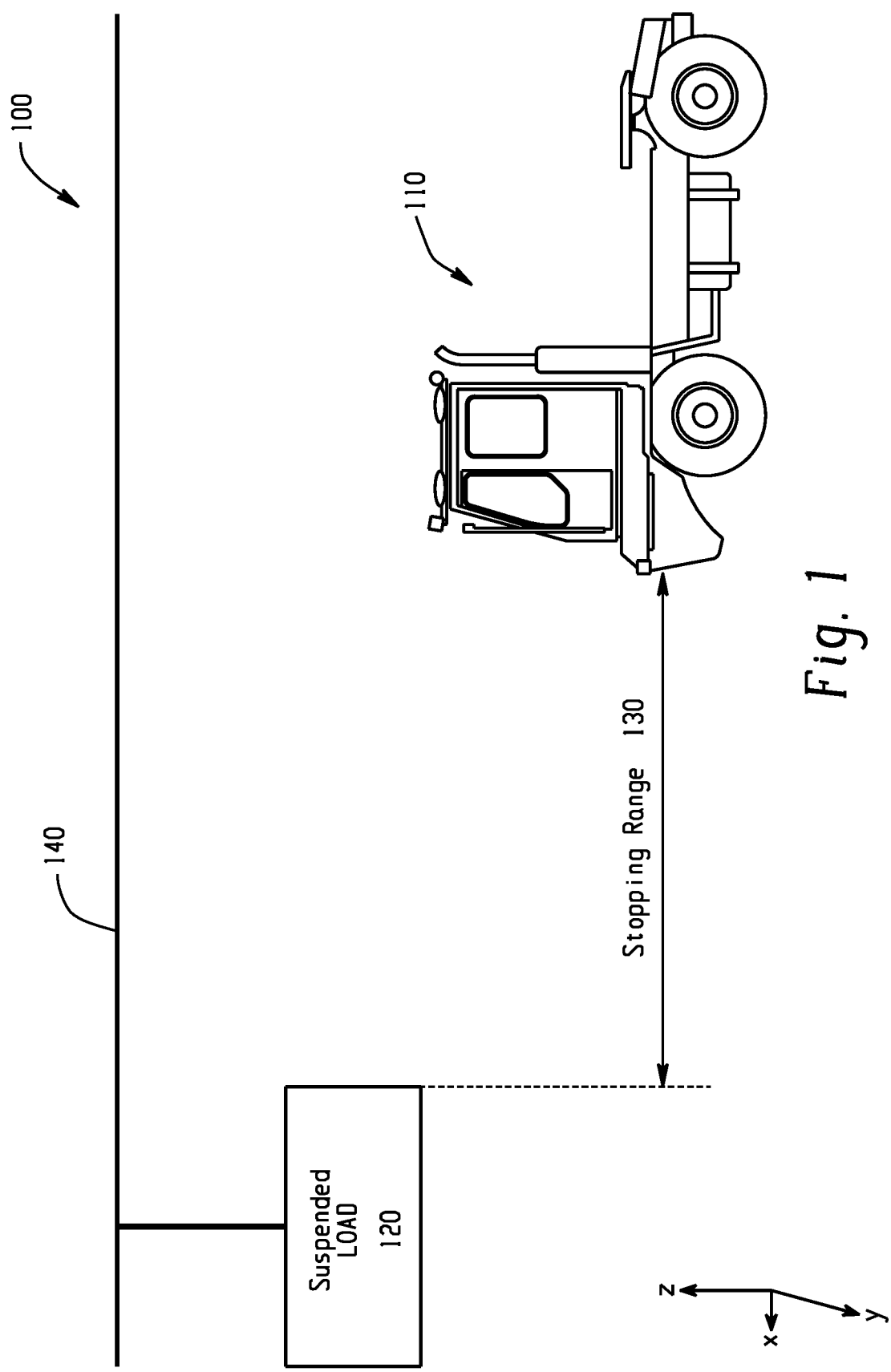
FIG. 1 is a block diagram illustrating an autonomous vehicle maneuvering about an environment in accordance with various embodiments of the present disclosure.

In one aspect, method for detecting a suspended load by an autonomous vehicle maneuvering about an environment includes receiving, from a scanning device mounted on and perpendicular to a top surface of the autonomous vehicle, a plurality of data points surrounding the autonomous vehicle. A point detection module detects whether an object is present within a detection range of the autonomous vehicle by: clustering subsets of the plurality of data points and determining whether at least one clustered subset of the plurality of data points is within the detection range. Based on the object being present within the detection range, at least three features are extracted from the object to detect whether the object is a suspended load. The maneuvering of the autonomous vehicle is controlled based on detection of the suspended load.

In some variations, the controlling includes halting maneuvering of the autonomous vehicle when (i) the object is detected as the suspended load and (ii) the autonomous vehicle is within a predetermined range of the suspended load.

In other variations, the detecting presence of the object can include: identifying a first portion of the plurality of data points that are present to either the left or the right of a center line of the autonomous vehicle and determining whether any of data points in the first portion are within (i) a first predetermined distance in front of the autonomous vehicle and (ii) a first predetermined height range. A first feature of the object can be identified based on presence of any data point of the first portion within the first predetermined distance and the predetermined height range. The determining can be repeated for a second portion of the plurality of data points that are present on an opposite side of the center line than the first portion based on none of the data points in the first portion being within the first predetermined distance and the first predetermined height range. Based on the first feature being identified the detecting presence of the object can further include determining whether any of data points in the first portion are within a second predetermined distance in front of the autonomous vehicle that is behind the first feature. A second feature of the object can be identified based on presence of any data point of the first portion within the second predetermined distance. Based on the second feature being identified the detecting presence of the object can further include determining whether any of data points in the first portion are within a second predetermined height range. The object can be identified as the suspended load positioned between the first feature and the second feature based on presence of any data point of the first portion within the second predetermined height range. Based on none of the data points in the first portion being within the second predetermined distance or the second predetermined height range, the detecting presence of the object can further include determining whether any of data points in a second portion are within (i) the first predetermined distance in front of the autonomous vehicle and (ii) the first predetermined height range. The first feature of the object can be identified based on presence of any data point of the second portion within the first predetermined distance and the predetermined height range. The second portion of the plurality of data points can include data points that are present on an opposite side of the center line than the first portion.

In some variations, when the plurality of data points are not within the detection range, the controlling can include maintaining the maneuvering of the autonomous vehicle.

In other variations, the scanning device can be a light and detection ranging (LiDAR) device and the plurality of data points can include a plurality of LiDAR data points.

In some variations, the clustering can include identifying a subset of the plurality of data points located within a designated region, determining whether the subset is greater than a threshold value, and based on the subset being greater than the threshold value, generating a plurality of clusters among the subset based on distances between each data point. Coordinates of the plurality of clusters can be provided by the point detection modules to the suspended load detection module.

In other variations, method can include filtering the plurality of data points to remove any data points that fall within a predetermined region of the environment so as to exclude load stacks.

In some variations, the autonomous vehicle can be an autonomous prime mover and the environment can be a shipping port environment.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the examples.

DETAILED DESCRIPTION

Autonomous vehicles operate with minimal to no human interaction. There are numerous ways autonomous vehicles are utilized in both personal and commercial settings. In a personal setting, for example, people can use autonomous vehicles to get from point A to point B such as driving to or from work or school. In a commercial setting, autonomous vehicles can be used to transport people or goods from point A to point B such as placing goods onto or retrieving goods off of stock shelves in retail spaces or storage warehouses or moving shipping containers around in a shipping port. In these examples, the goods and shipping containers are example loads for the autonomous vehicles. Depending on the size and/or weight of loads, the use of a crane or crane system may be necessary to place the load onto an autonomous vehicle or remove the loads from an autonomous vehicle. Cranes can be used to lift or move loads as well as hold the loads. In each of these cases, the loads are considered to be suspended when they are in the process of being lifted from either the ground or a docking location (e.g., trailer of an autonomous vehicle or a storage stack). There are dangers associated with suspended loads. For example, cranes can malfunction causing a suspended load to drop. A load can also be misplaced by crane. If a load drops, it can cause damages to the load and/or its surroundings. To avoid such dangers, precautions can be taken such as preventing maneuvering of people and/or autonomous vehicles while a load is suspended. The subject matter described herein provides systems, methods, and computer-programmable products for autonomous vehicles to detect suspended loads. The precision described herein may not be attainable by humans due to lack of visibility and positional feedback of human eyes.

FIG. 1 is a block diagram illustrating an autonomous vehicle 110 maneuvering about an environment 100 in accordance with various embodiments of the present disclosure. Using the various algorithms and devices described herein, the autonomous vehicle 110 can detect objects such as a suspended load 120 that are within a certain vicinity of the autonomous vehicle 110. The suspended load 120 can be suspended in the air, for example, by a load bearing device 140. When the object is identified as a suspended load 120, the autonomous vehicle 130 can control its own maneuvering (e.g., by applying a braking mechanism of the autonomous vehicle 130 or halting further acceleration) when it is within a stopping range 130 from the suspended load 120. The halting of any maneuvering of the autonomous vehicle 110 can continue until the suspended load 120 is no longer detected to be within the stopping range 130.

Figure 2:
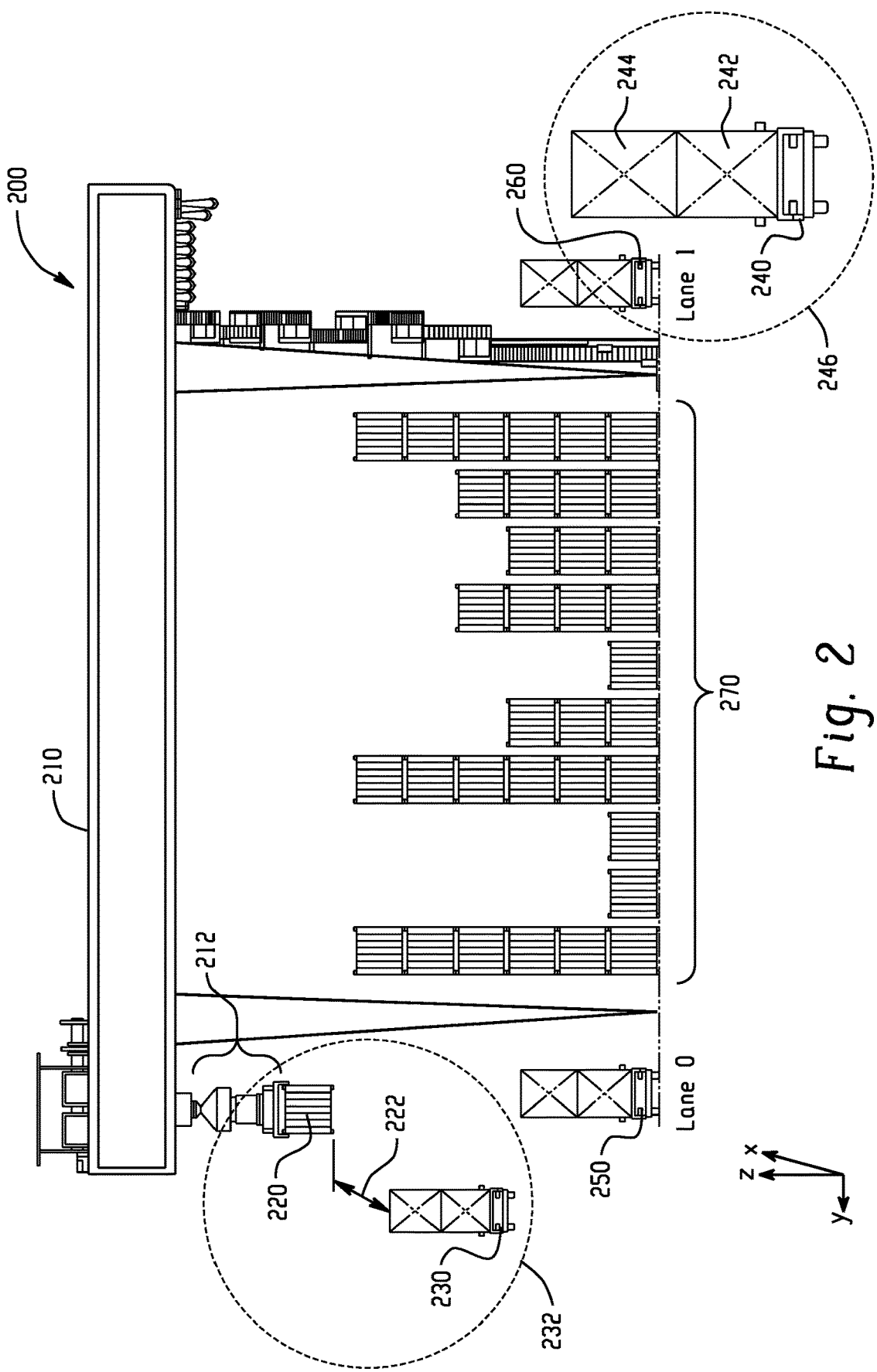
FIG. 2 is a block diagram illustrating a shipping port environment including a crane having a suspended load and autonomous vehicles maneuvering therein in accordance with various embodiments of the present disclosure.

FIG. 2 is a block diagram illustrating a shipping port environment 200 including a crane 210 (e.g., load bearing device 140) having a suspended load 220 (e.g., suspended load 120) and autonomous vehicles 230, 240 maneuvering therein in accordance with various embodiments of the present disclosure. Any number of autonomous vehicles such as autonomous vehicles 230, 240, 250, 260 can maneuver about shipping port environment 200. Autonomous vehicles 230, 240, 250, 260 can be used to transport loads such as containers (e.g., containers 242, 244) about the shipping port environment 200. Loads are often stored in a shipping port environment 200 in a number of stacks such as load stacks 270. A load bearing device 140 such as a crane 210 can be used to arrange loads into load stacks 270. The crane 210 can place a load onto an autonomous vehicle by picking it up from one of the load stacks 270 and placing it onto an autonomous vehicle. The crane 210 can also remove a load from an autonomous vehicle by picking it up from the autonomous vehicle and placing it onto an existing load stack or placing it onto the ground to create a new load stack. The crane 210, in some embodiments, is a gantry crane. In the example shipping port environment 200 illustrated in FIG. 2, a suspended load 220 is being moved between autonomous vehicle 250 and load stacks 270. Autonomous vehicle 250 is stationary and parked in lane 0 of the shipping port environment 200. Similarly, autonomous vehicle 260 is stationary and parked in lane 1 of the shipping port environment 200.

A load being moved by the crane 210 is known as a suspended load 220. Suspended load 220 is moved using a spreader 212 of the crane 210. For safety reasons, autonomous vehicles within a vicinity of the suspended load 220 are not permitted to drive past the suspended load 220. This is to avoid, for example, damage to the autonomous vehicle or any loads the autonomous vehicle may be transporting. Autonomous vehicles within a vicinity of the suspended load 220 are to stop a certain distance away from the suspended load 220. For example, autonomous vehicle 230 has a detection range 232 (e.g., 20-30 meters in the x-axis) within which it can detect any objects such as crane 220 and suspended load 220. The autonomous vehicle 230 detects objects within detection range 232 using features extracted from the crane 210 and the suspended load 220, as described in more detail in FIGS. 8A-8B. For safety purposes, the autonomous vehicle 230 should stop when it is within a stopping range 222 (e.g., 10-15 meters in the x-axis) of an object that is identified as the suspended load 220. This stopping range 222 is defined as the horizontal distance from a front bumper of the autonomous vehicle 230 to the suspended load 220. In other words, when the autonomous vehicle 230 detects that an object that is identified as the suspended load 220 is within the stopping range 222, it can halt any further maneuvering by, for example, ceasing acceleration of the autonomous vehicle 230 and/or applying a braking mechanism of the autonomous vehicle 230. The stopping range 222 is defined to be a predetermined distance from the suspended load 220. Once the suspended load 220 is no longer detected within the stopping range 222 (e.g., it has been secured onto autonomous vehicle 250 or placed into a load stack 270), the autonomous vehicle 230 can resume its maneuvering about the shipping port environment 200.

Each autonomous vehicle has its own detection range defined by sensing capabilities and/or position of one or more sensing devices on the autonomous vehicle. The safety range to the suspended load 220 is the same for all autonomous vehicles. For example, autonomous vehicle 240 has a detection range 246 defined by the sensing devices mounted onto autonomous vehicle 240. As illustrated in FIG. 2, there is no suspended load detected within the detection range 246 and autonomous vehicle 240 can continue to maneuver within shipping port environment 200. When navigating in a shipping port environment 200, an autonomous vehicle passes to the left of the crane 210 or to the right of the crane 210. The suspended load 220 is typically positioned underneath the crane 210. An autonomous vehicle utilizes a suspended load detection system 1100 to extract features from the crane 210 and/or the suspended load 220 in order to detect the presence of a suspended load 220.

Figure 3:
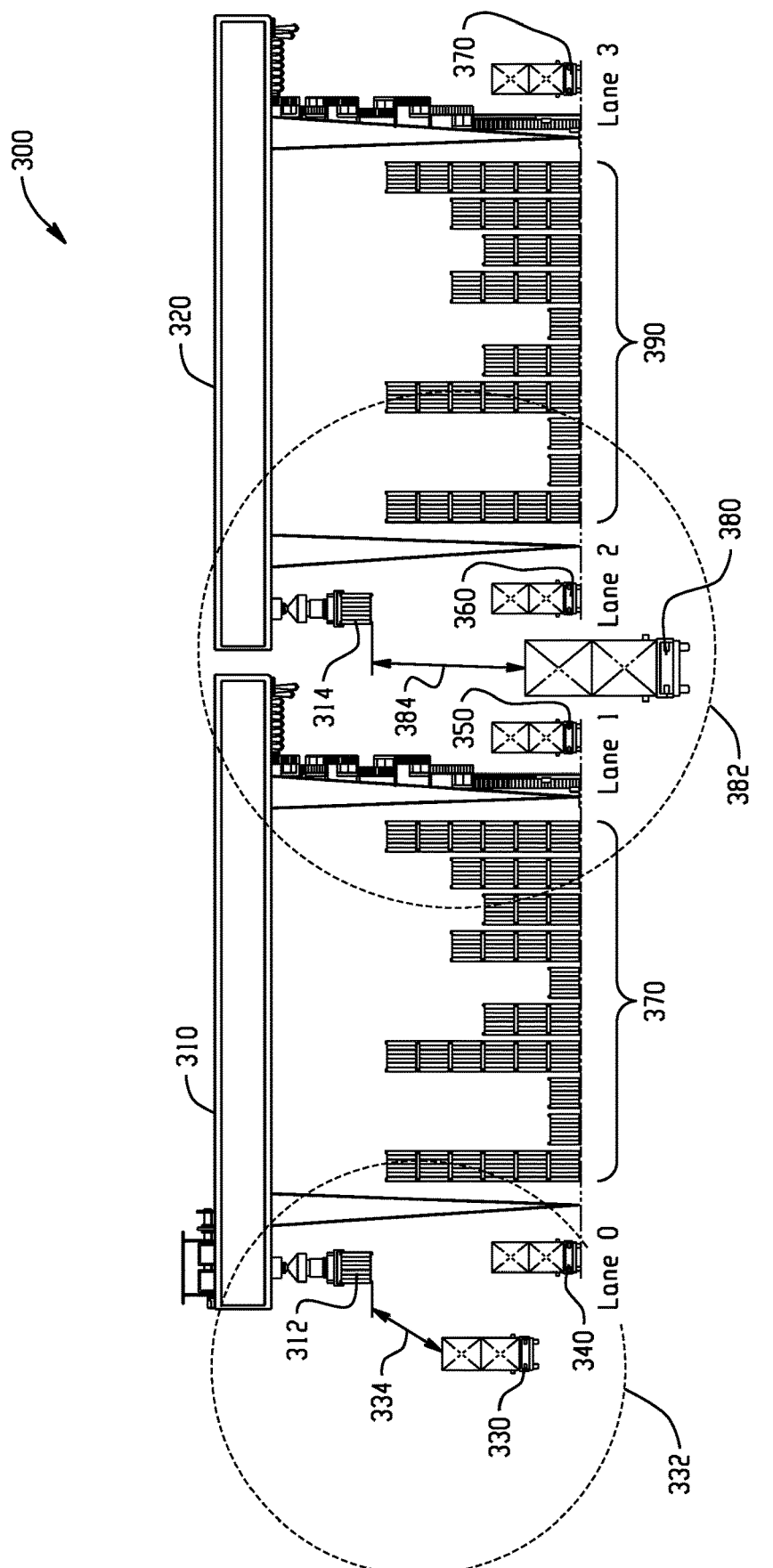
FIG. 3 is a block diagram illustrating another example shipping port environment including two cranes (e.g., load bearing device) moving suspended loads (e.g., suspended load) and autonomous vehicles maneuvering therein in accordance with various embodiments of the present disclosure.

FIG. 3 is a block diagram illustrating another example shipping port environment 300 including two cranes 310, 320 (e.g., load bearing device 140) moving suspended loads 312, 314 (e.g., suspended load 120) and autonomous vehicles 330, 340, 350, 360, 370 maneuvering therein in accordance with various embodiments of the present disclosure. Shipping port environment 300 can include lanes designated for autonomous vehicles to park and onload or offload loads. For example, shipping port environment 300 can includes lane 0 with stationary autonomous vehicle 340 parked therein, lane 1 with stationary autonomous vehicle 350 parked therein, lane 2 with stationary autonomous vehicle 360 parked therein, and lane 3 with stationary autonomous vehicle 370 parked therein. Each lane (e.g., lane 0, lane 1, lane 2, lane 3) are defined by the cranes 310, 320 such that the lane is underneath a loading area of the respective crane.

Autonomous vehicles 330, 380 are maneuvering about the shipping port environment 300. Autonomous vehicle 330 has a detection range 332 (e.g., 20-30 meters in the x-axis) within which it can detect any objects such as crane 310, suspended load 312, and load stacks 370. The autonomous vehicle 330 detects objects within detection range 332 using features extracted from the crane 310, the suspended load 312, and load stacks 370 as described in more detail in FIGS. 8A-8B. Some extracted features such as those from load stacks 370 may be filtered out by the point detection module 814 for the purpose of identifying the suspended load 312. For safety purposes, the autonomous vehicle 330 should stop when it is within a stopping range 334 (e.g., 10-15 meters in the x-axis) of the suspended load 220. This stopping range 334 is defined as the horizontal distance from a front bumper of the autonomous vehicle 330 to the suspended load 312. In other words, when the autonomous vehicle 330 detects that an object identified as a suspended load 312 is within the stopping range 334, it can halt any further maneuvering by, for example, ceasing any acceleration of the autonomous vehicle 330 and/or applying a braking mechanism of the autonomous vehicle 330. The stopping range 334 is defined to be a predetermined distance from the suspended load 312. Once the suspended load 312 is no longer detected within the stopping range 334 (e.g., it has been secured onto autonomous vehicle 340 or placed into a load stack 370), the autonomous vehicle 330 can resume its maneuvering about the shipping port environment 300.

Similarly, autonomous vehicle 380 has a detection range 382 (e.g., 20-30 meters in the x-axis) within which it can detect any objects such as cranes 310, 320, suspended load 314, and load stacks 370, 390. The autonomous vehicle 380 detects objects within detection range 382 using features extracted from cranes 310, 320, suspended load 314, and load stacks 370, 390 as described in more detail in FIGS. 8A-8B. Some extracted features such as those from the load stacks 370, 390 may be filtered out by the point detection module 814 for the purpose of identifying the suspended load 314. For safety purposes, the autonomous vehicle 380 should stop when it is within a stopping range 384 (e.g., 10-15 meters in the x-axis) of the suspended load 314. This stopping range 384 is defined as the horizontal distance from a front bumper of the autonomous vehicle 380 to the suspended load 314. In other words, when the autonomous vehicle 380 detects that an object identified as a suspended load 314 is within the stopping range 384, it can halt any further maneuvering by, for example, ceasing any acceleration of the autonomous vehicle 380 and/or applying a braking mechanism of the autonomous vehicle 380. The stopping range 384 is defined to be a predetermined distance from the suspended load 314. Once the suspended load 314 is no longer detected within the stopping range 384 (e.g., it has been secured onto autonomous vehicle 360 or placed into a load stack 390), the autonomous vehicle 380 can resume its maneuvering about the shipping port environment 300.

Figure 4:
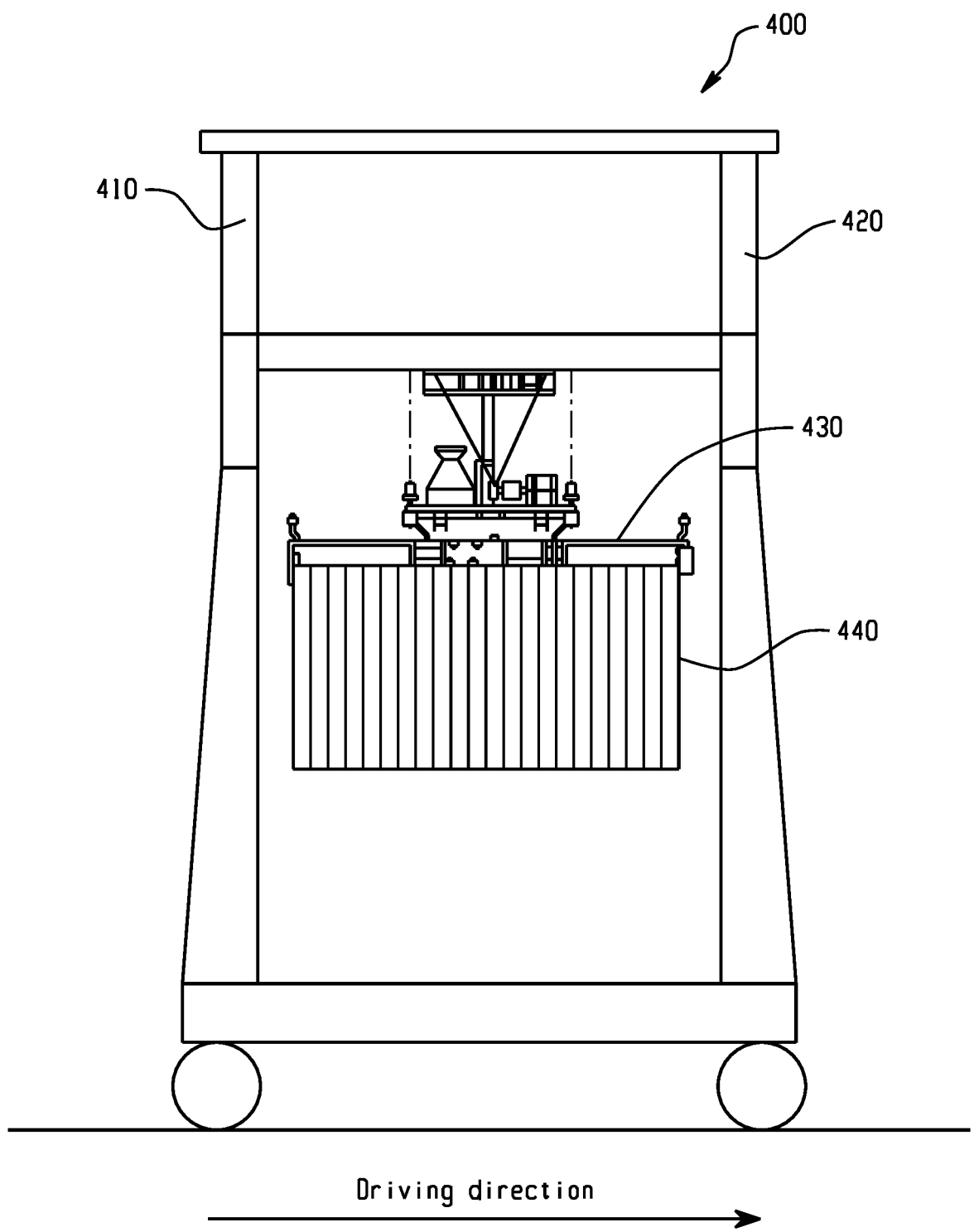
FIG. 4 is a diagram illustrating a side view of an example crane in accordance with various embodiments of the present disclosure.

FIG. 4 is a diagram illustrating a side view of an example crane 400 in accordance with various embodiments of the present disclosure. As described in more detail in FIGS. 8-9, the suspended load detection system 1100 can extract features from objects detected by an autonomous vehicle (via its scanning devices). These features can include a front plate 410 of crane 400, a rear plate 420 of crane 400, spreader 430, and/or a suspended load 440. The front plate 410 and rear plate 420 of crane 400 are defined based on the driving direction of the autonomous vehicle. For example, the first plate an autonomous vehicle comes across while travelling along the driving direction annotated in FIG. 4 is defined as the front plate. And the second plate an autonomous vehicle comes across while traveling along the driving direction annotated in FIG. 4 is defined as the rear plate.

Figure 5A:
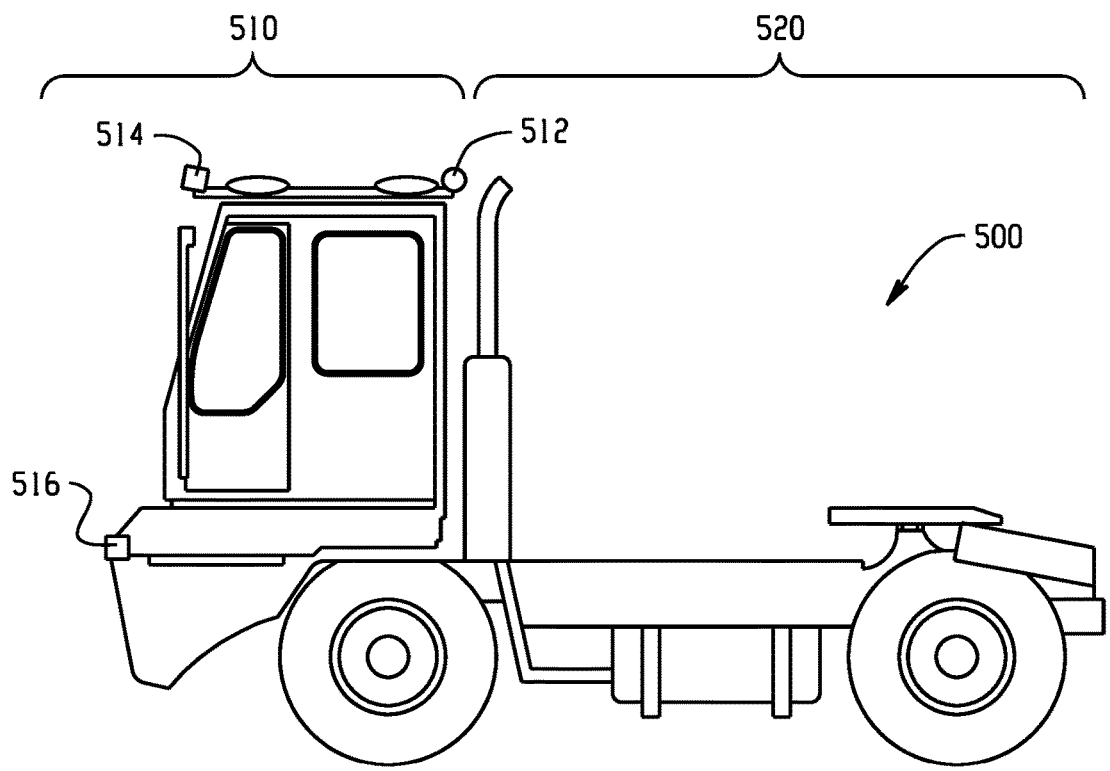
FIG. 5A is a diagram illustrating a side view of an example autonomous vehicle for transporting containers in accordance with various embodiments of the present disclosure.
Figure 5B:
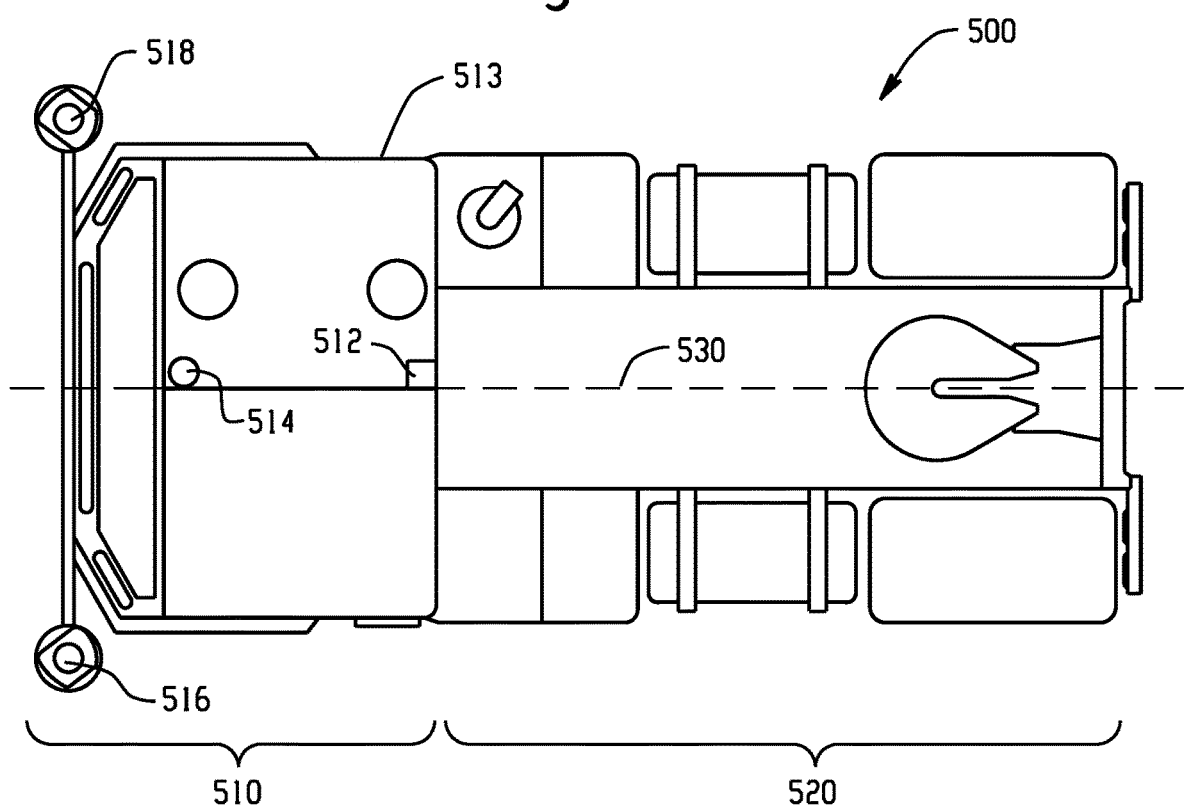
FIG. 5B is a diagram illustrating a top view of the example autonomous vehicle for transporting containers in accordance with various embodiments of the present disclosure.

FIG. 5A is a diagram illustrating a side view of an example autonomous vehicle 500 for transporting containers in accordance with various embodiments of the present disclosure. FIG. 5B is a diagram illustrating a top view of the example autonomous vehicle 500 for transporting containers in accordance with various embodiments of the present disclosure. The example autonomous vehicle 500 of FIGS. 5A-5B is specific to the shipping industry. However, it can be appreciated by those of ordinary skill in the art that this is merely an example for illustrative purposes. In a shipping port environment 200 such as a container transshipment hub, an example autonomous vehicle 500 is an autonomous platform mover (APM) such as an autonomous prime mover. In this example, the autonomous vehicle 500 includes an APM head 510 and an APM trailer 520. One or more containers (e.g., containers 242, 244) can be placed on APM trailer 520 for securement and transport using crane 210. For the purpose of illustration and ease of understanding, no containers are illustrated in FIGS. 5A-5B. Mounting and/or offloading containers onto the APMs can be performed by an external entity such as crane 210.

Figure 11:
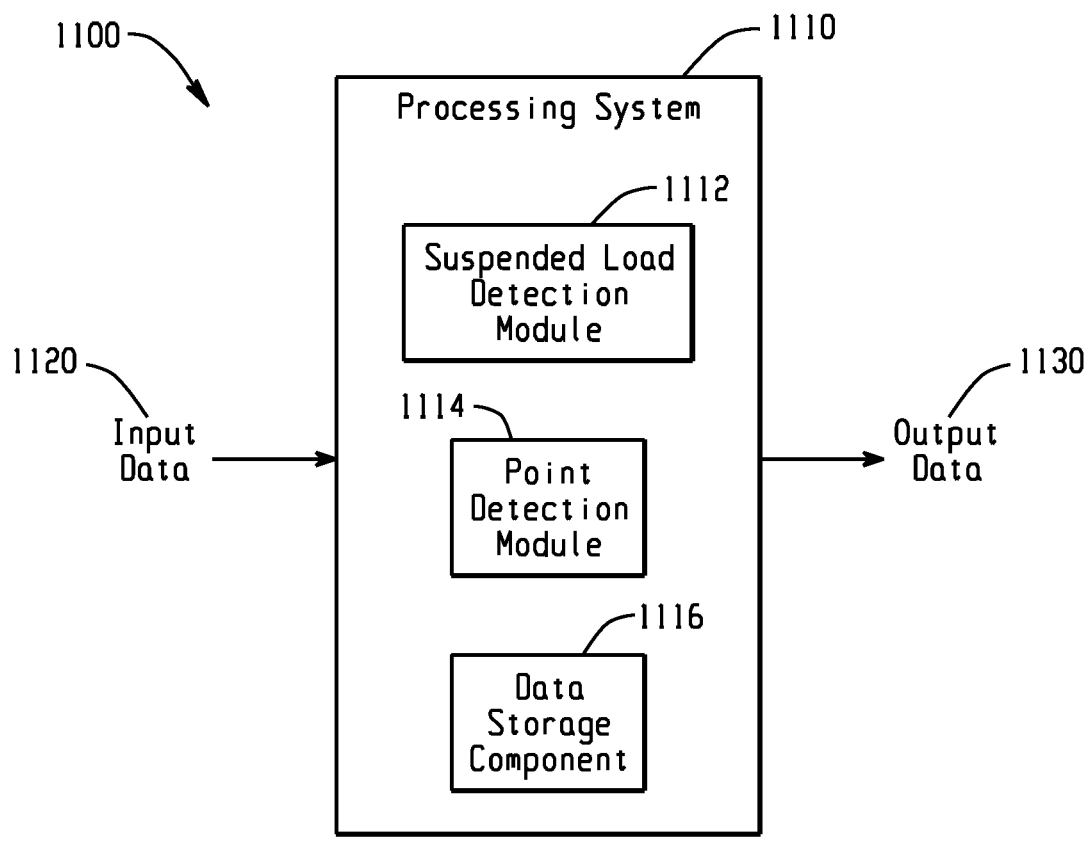
FIG. 11 illustrates an example suspended load detection system that processes input data and generates output data in accordance with various embodiments of the present disclosure.

The APM head 510 includes a cabin 513 housing electronics for operation of the autonomous vehicle 500, including the suspended load detection system 1100 described in FIG. 11. The APM head 510 can include one or more LiDAR scanning devices 512, 514, 516, 518 mounted thereon. More specifically, LiDAR scanning devices 512, 514 are mounted on a centerline 530 of the APM head 510 on top of the cabin 513 (e.g., leftmost side edge of the cabin 513). LiDAR scanning device 512 is the center point for defining the detection range (e.g., detection ranges 232, 246) of autonomous vehicle 500. LiDAR scanning device 512 has a view of the area behind the autonomous vehicle 500. The mounting and positioning of the one or more LiDAR scanning devices 512, 514, 516, 518 is described in more detail in FIG. 6. The one or more LiDAR scanning devices 512, 514, 516, 518 can perform scanning to collect data points associated with a suspended load 220 being moved by crane 210. At least some, if not all, collected data points (e.g., LiDAR points) are processed by the suspended load detection module 1112 as described in detail in FIGS. 8-9.

Figure 6:
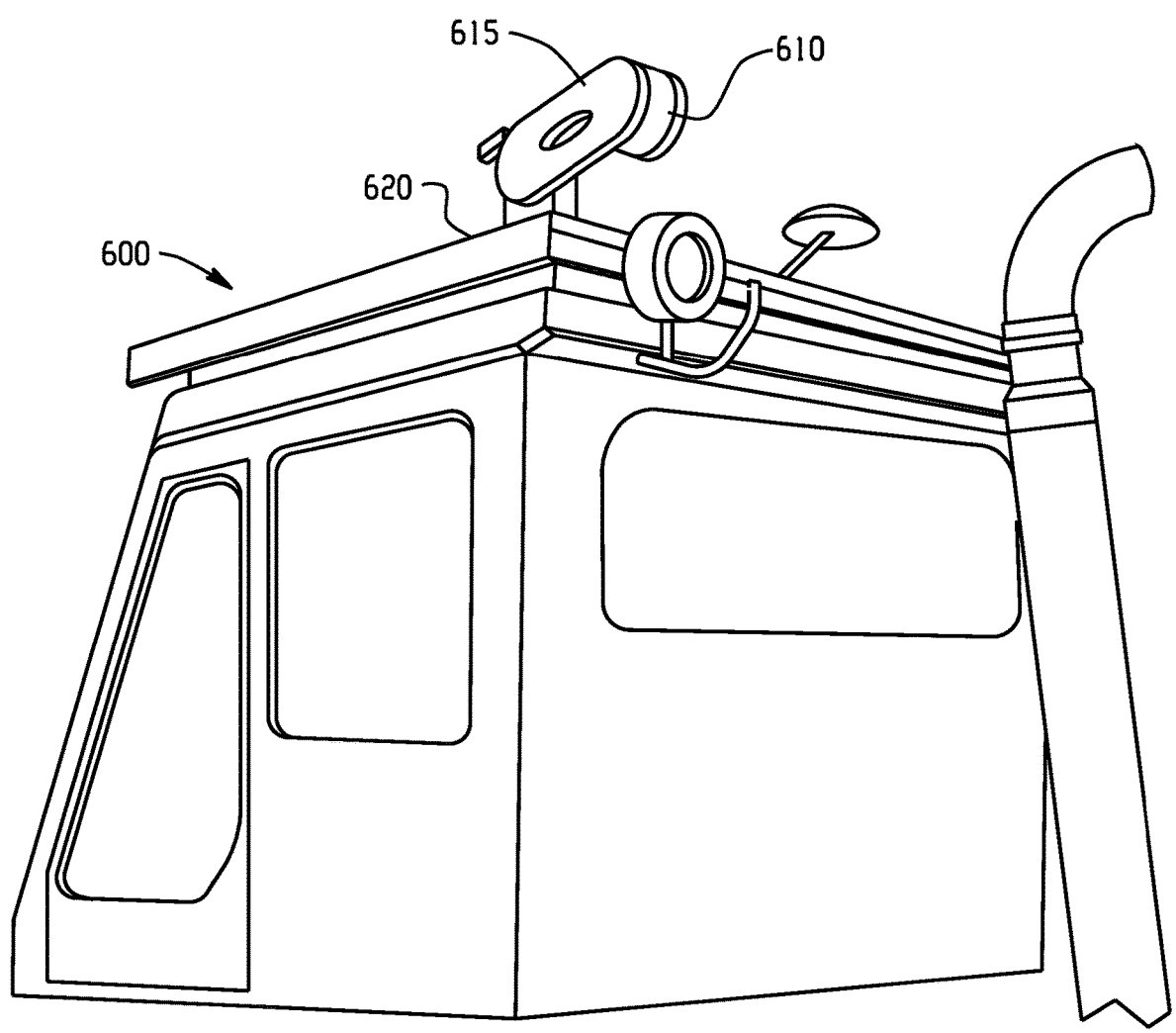
FIG. 6 is a diagram illustrating a side view of an example APM head in accordance with various embodiments of the present disclosure.
Figure 7:
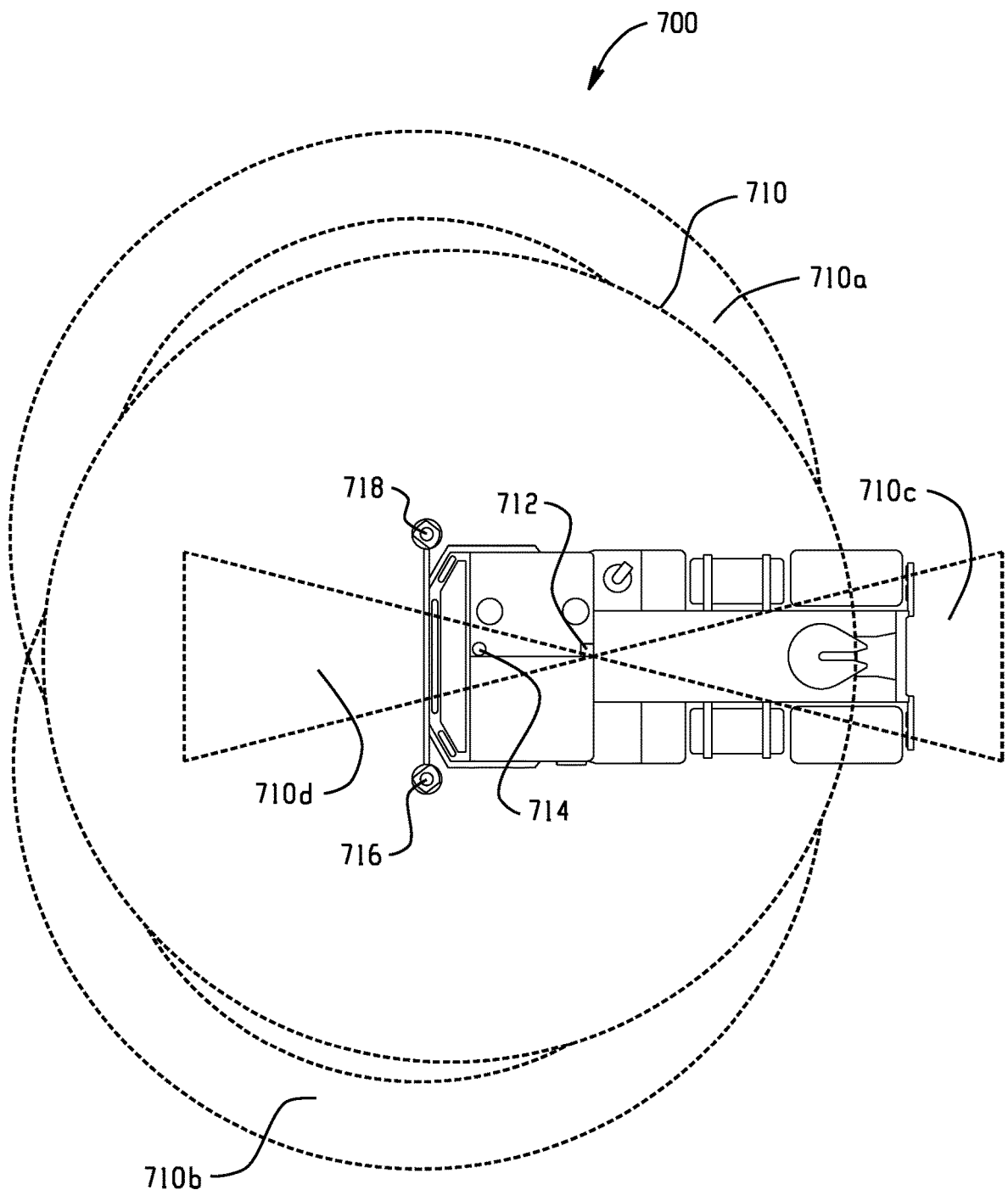
FIG. 7 is a diagram illustrating a top view of multiple LiDAR scanning zones that cumulatively form a 360-degree LiDAR scanning zone of an example autonomous vehicle in accordance with various embodiments of the present disclosure.

FIG. 6 is a diagram illustrating a side view of an example APM head 600 in accordance with various embodiments of the present disclosure. A LiDAR scanning device 610 (e.g., LiDAR scanning device 512 of FIG. 5A) is mounted on a surface 620 of the APM head 600 (e.g., cabin 513) via a mounting bracket 615. Mounting bracket 615 facilitates the positioning of a LiDAR scanning device 610 approximately perpendicular to the surface 620 of the APM head 600. LiDAR scanning devices 514, 516, 518 are oriented in a horizontal manner (e.g., parallel orientation). The perpendicular orientation of the LiDAR scanning device 610 coupled with multiple LiDAR scanning devices 610 (e.g., equivalent to LiDAR scanning device 512), 514 516, 518 enables scanning of approximately 360-degrees surrounding the autonomous vehicle 500, to any objects within the detection range 232. More specifically, FIG. 7 is a diagram 700 illustrating a top view of multiple LiDAR scanning zones 710a, 710b, 710c, 710d that cumulatively form a 360-degree LiDAR scanning zone 710 of an example autonomous vehicle in accordance with various embodiments of the present disclosure. LiDAR scanning zone 710a is facilitated by the positioning of LiDAR scanning device 518. LiDAR scanning zone 710b is facilitated by the positioning of LiDAR scanning device 516. LiDAR scanning zone 710c is facilitated by LiDAR scanning device 512. LiDAR scanning zone 710d is facilitated by LiDAR scanning device 514. The LiDAR points detected within the 360-degree LiDAR scanning zone 710 (e.g., LiDAR scanning zones having visibility of the suspended load 220 including LiDAR scanning zones 710a, 710b, 710c, 710d) can be processed by the suspended load detection system 1100 described in detail in FIG. 11.

Figure 8A:
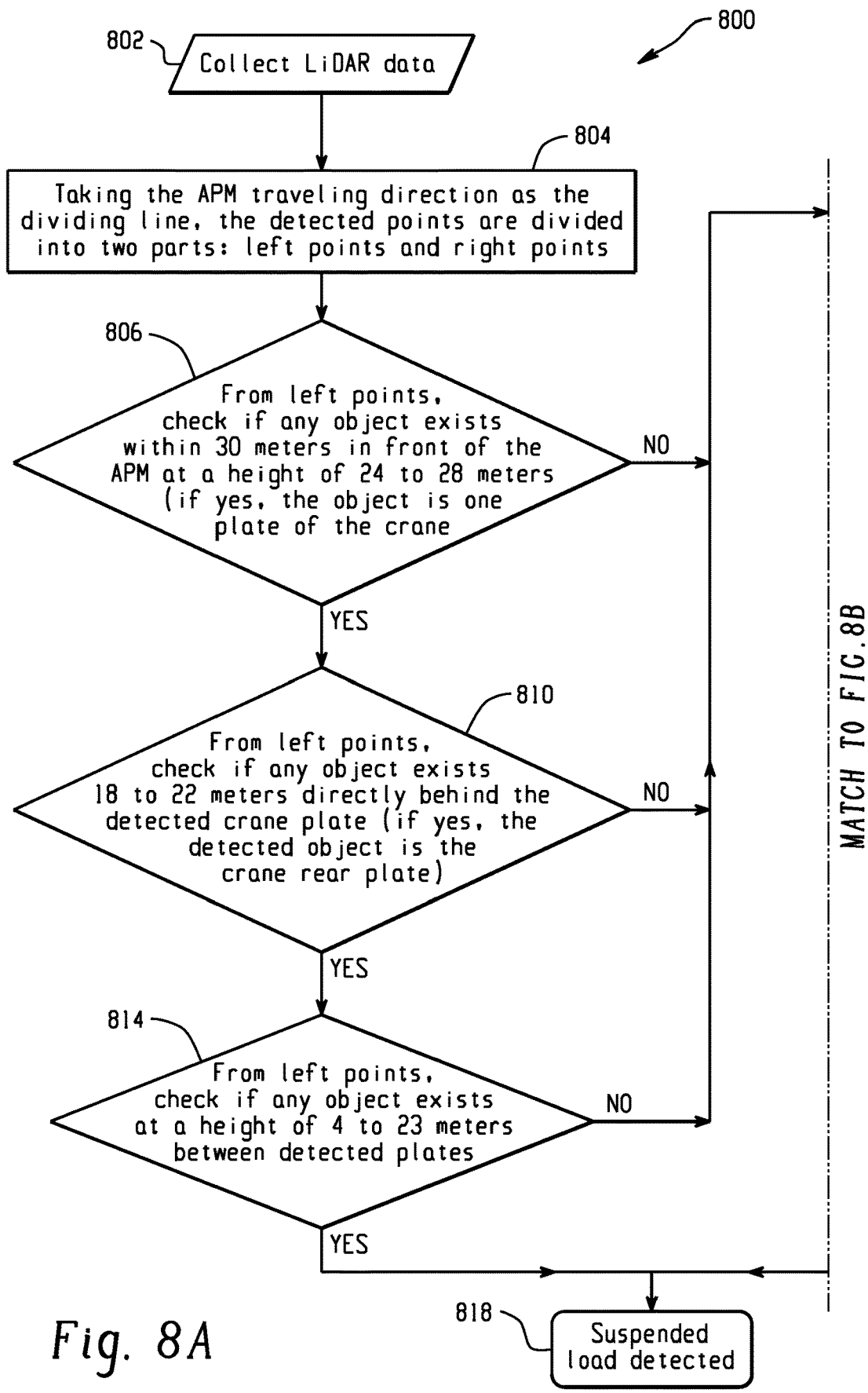
FIGS. 8A-8B is a process flow diagram illustrating a method of detecting features of a suspended load in accordance with various embodiments of the present disclosure.
Figure 8B:
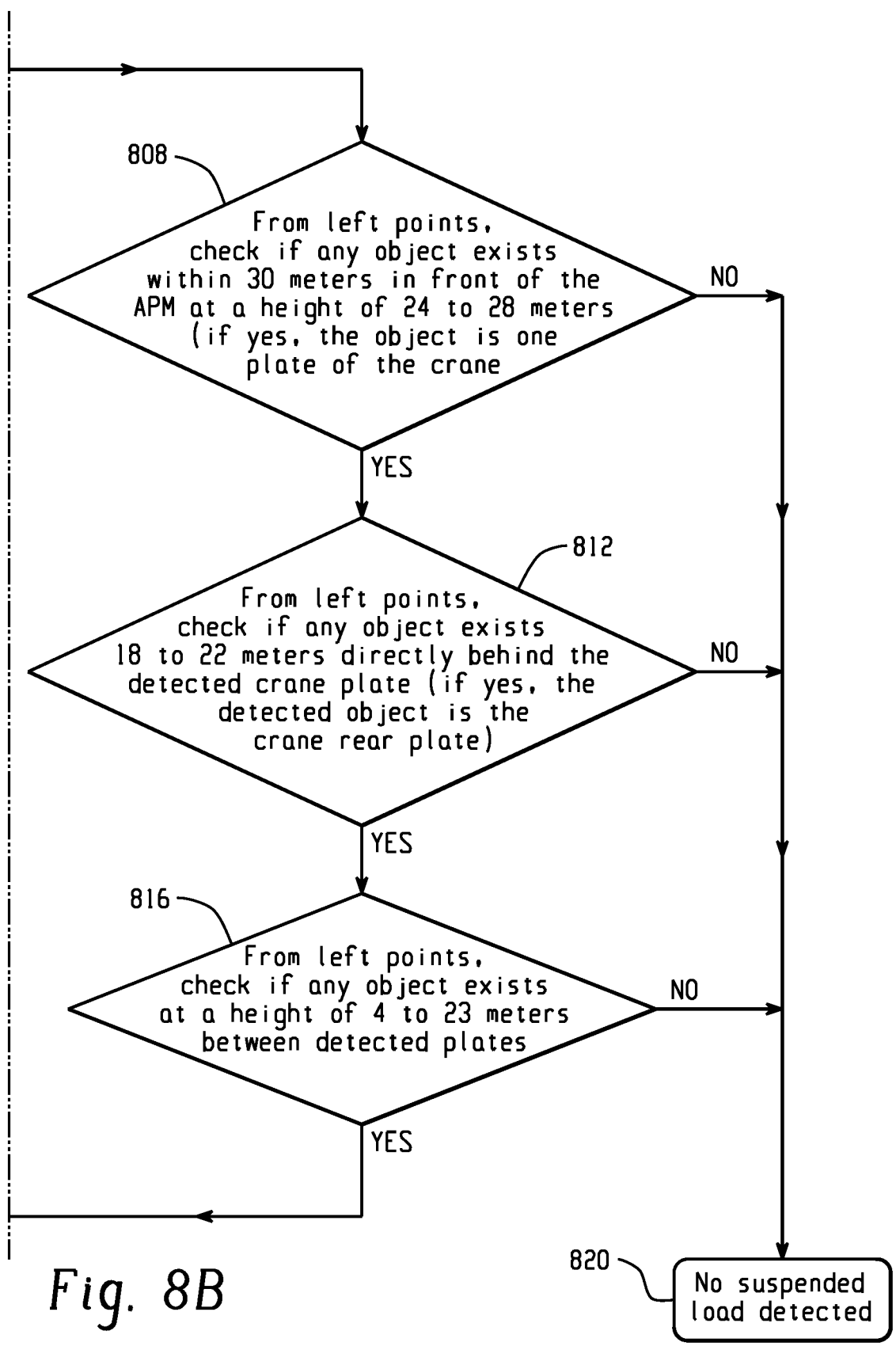

FIGS. 8A-8B is a process flow diagram 800 illustrating a method of detecting features of a suspended load in accordance with various embodiments of the present disclosure. The method is performed by the suspended load detection module 1112 illustrated in FIG. 11. In order for an autonomous vehicle such as autonomous vehicle (e.g., autonomous vehicles 230, 240, 330, 380) to detect a suspended load (e.g., suspended loads 220, 312, 314), LiDAR data is collected, at step 802, from one or more of the LiDAR scanning devices 512, 514, 516, 518. Each of the steps that follow step 802 can utilize the point detection module 1114 and its corresponding point detection algorithm described in FIG. 9 to identify objects such as plates (e.g., front plate 410, rear plate 420) of crane 400. As previously discussed in FIG. 2, autonomous vehicles navigating about a shipping port environment (e.g., shipping port environments 200, 300) pass a crane (e.g., cranes 210, 310, 320) on either the left side or the right side. In other words, the suspended load (e.g., suspended loads 220, 312, 314) is either on the left side of the autonomous vehicle or on the right side of the autonomous vehicle. The centerline 530 can be used to divide, at step 804, any detected LiDAR points into left points (e.g., points falling to the left of the centerline 530) and right points (e.g., points falling to the right of the centerline 530). Because the suspended load 220 is typically under the crane (e.g., cranes 210, 310, 320), the position of the crane is first identified. The crane is typically the tallest object in a shipping port environment and the height of the crane is a known value. For example, in a shipping port environment, the height of the crane can be 25-30 m and it has a number of components such as crane plates (e.g., front plate 410, rear plate 420). From the left points, it can be determined, at step 806, whether an object is detected within a certain distance (e.g., 30 m) in front of the autonomous vehicle (e.g., in the x-direction) at a particular height (e.g., 24-28 m in the z-direction). If an object is detected within this predetermined distance at a particular height, it is identified as a feature of the crane such as a crane plate (e.g., front plate 410 of crane 400). At step 810, the left points can be further analyzed to determine whether an object is detected in front of the autonomous vehicle, behind the detected feature of the crane. More specifically, it can be determined whether left points within another predetermined distance (e.g., 18-22 m) in front of the autonomous vehicle at a particular height (e.g., 24-28 m in the z-direction), just behind the detected feature of the crane are present. If there are left points within this predetermined distance in front of the autonomous vehicle, just behind the detected feature of the crane, then the detected feature is a rear plate 420 of the crane 400. With at least two features (e.g., front plate 410, rear plate 420) of the crane detected, still using the left points, it can be determined, at step 814, whether an object is detected between the plates at a plate separation height (e.g., between 4-23 m). If an object is detected between the plates, it is determined that the detected object is the suspended load at step 818. Absent an object being detected between the plates, the right points are considered at step 808.

In any of steps 806, 810, and 814, if an object is not detected within the left points as described in the respective steps, then the right points are considered. For example, returning back to step 806, if an object is not detected within the predetermined distance at particular height in front of the autonomous vehicle, then the right points are considered at step 808. Similarly, if an object is not detected behind the autonomous vehicle in step 810, then the right points are considered at step 808. Lastly, if an object is not detected at step 814 between the crane plates identified in steps 806, at step 810, then the right points are considered at step 808.

Step 808, step 812, and step 816 mirror the analysis performed in step 806, step 810, and step 814, respectively, using the right points as opposed to the left points. More specifically, from the right points, it can be determined, at step 808, whether an object is detected within a certain distance (e.g., 30 m) in front of the autonomous vehicle (e.g., in the x-direction) at a particular height (e.g., 24-28 m in the z-direction). If an object is detected within this predetermined distance at a particular height, it is identified as a feature of the crane such as a crane plate (e.g., front plate 410 of crane 400). At step 812, the right points can be further analyzed to determine whether an object is detected in front of the autonomous vehicle, behind the detected feature of the crane. More specifically, it can be determined whether right points within another predetermined distance (e.g., 18-22 m) in front of the autonomous vehicle at a particular height (e.g., 24-28 m in the z-direction), just behind the detected feature of the crane are present. If there are right points within this predetermined distance in front of the autonomous vehicle, just behind the detected feature of the crane, then the detected feature is a rear plate 420 of the crane 400. With at least two features (e.g., front plate 410, rear plate 420) of the crane detected, still using the right points, it can be determined, at step 816, whether an object is detected between the plates at a plate separation height (e.g., between 4-23 m). If an object is detected between the plates, it is determined that the detected object is the suspended load at step 818. In any of step 810, step 812, and step 816, if an object is not detected within the right points, then it is determined that no suspended load is detected at step 820. With no suspended load detected at step 820, the autonomous vehicle may continue with its maneuvering. Alternatively, if a suspended load is detected at step 818 and that suspended load is within the stopping range, the autonomous vehicle maneuvering is halted through, for example, automatic application by the autonomous vehicle of its braking mechanism. The steps within the process flow diagram 800 can be repeated to determine whether the detected suspended load is still present within the stopping range. Once the suspended load is no longer detected (e.g., at step 820), the autonomous vehicle can resume its maneuvering about the shipping port environment 200.

For the autonomous vehicle 380, the definitions of the front plate 410 at step 808 and the rear plate 420 at step 812 are the same as those in steps 806 and 810, but with respect to different cranes 310, 320 with step 806 and step 810 extracting features of the crane 310 on the left side of autonomous vehicle 380 and step 808 and step 812 extracting features of the crane 320 on the right side of the autonomous vehicle 380.

Figure 9:
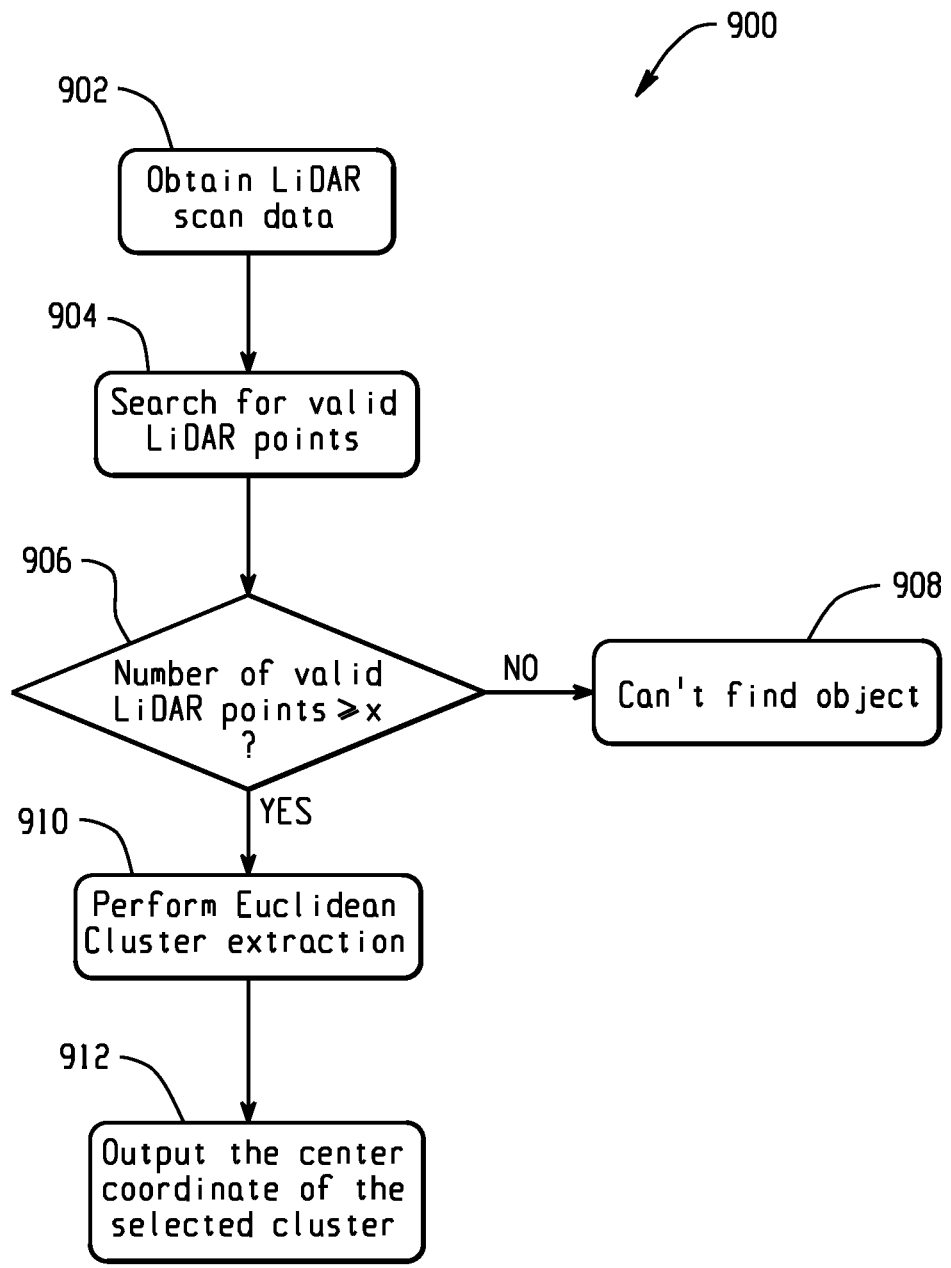
FIG. 9 is a process flow diagram illustrating steps performed by a point detection module of autonomous vehicle in accordance with various embodiments of the present disclosure.

FIG. 9 is a process flow diagram 900 illustrating steps performed by a point detection module 1114 of autonomous vehicle 500 in accordance with various embodiments of the present disclosure. For ease of understanding and illustration purposes only, FIG. 9 is discussed with reference to the shipping industry example. However, it can be appreciated by those of ordinary skill in the art that such example can be applicable to any industry or scenario where containers are loaded onto an autonomous vehicle.

In order to determine whether a suspended load is detected, points to the left of the autonomous vehicle (e.g., left points) and points to the right of the autonomous vehicle (e.g., right points) are first identified. LiDAR points are obtained using LiDAR data from the LiDAR scanning device(s) 512, 514, 516, 518 at step 902. The LiDAR scanning data is made up of a number of individual LiDAR data points. The LiDAR data points are considered features that are extracted from an object such as crane 210 or components of the crane 210. The LiDAR data points are filtered into a group of valid LiDAR data points that could potentially be either the suspended load 220 or components of the crane 210. This group of valid LiDAR data points is determined based on map information of the shipping port environment 200. Objects that are at the predetermined detection height of 4-28 m within the shipping port environment are known to be one of the suspended load 220, the spreader 212, crane 210 (or components thereof), or the load stacks 270. The objects of interest when detecting a suspended load 220 include the suspended load 220, the spreader 212, and the crane 210 (or components thereof). These data points can make up the group of valid LiDAR data points to start, which can be further refined through additional filtering. For example, the load stacks 270 are not of interest when detecting suspended loads and can be filtered out from the group of valid LiDAR data points. The location of the load stacks 270 is known to be a stagnant location and can be marked on a map of the shipping port environment 200. Any LiDAR points falling within the location of the load stacks 270, for example, can be filtered out and therefore not included within the subset of valid data points by the point detection module 1114. To accelerate the filtering process, the point detection module 1114 searches at step 904 for valid LiDAR data points that fall within the boundaries specified in the appropriate step (e.g., any of the boundaries in steps 806, 808, 810, 812, 814, 816). The suspended load detection module 1112 scans the collected LiDAR data points at step 904 for a subset of data points within these designated ranges. To determine whether an object is detected, the number of data points in the subset is compared to a threshold data point value at step 906. This threshold data point value is set based on object of interest. For example, in the context of the shipping industry, the number of LiDAR data points in the designated region is greater than 70 in order for effective object detection. If the number of valid LiDAR data points is less than or equal to the threshold data point value, then it is determined by the point detection module 1114 that an object cannot be found at step 908 and the point detection module 1114 generates output data indicating same.

If the number of valid LiDAR data points is greater than the threshold data point value, the point detection module 1114 clusters the subset of LiDAR data points based on the Euclidean distance between each LiDAR data point in the subset, at step 910. The Euclidean distance in a three-dimensional space is defined as:

$$d(p,q) = \sqrt{(q_1-p_1)^2 + (q_2-p_2)^2 + (q_3-p_3)} \tag{1}$$

where p and q each represent a different LiDAR data point in the subset having coordinates $(p_1, p_2, p_3)$ and $(q_1, q_2, q_3)$, respectively. Clusters are formed using a Euclidean distance threshold. A LiDAR data point is added to an existing cluster if the minimum Euclidean distance between the LiDAR data point and other LiDAR data points within the existing cluster is less than the Euclidean distance threshold. Otherwise, a new cluster is formed with that LiDAR data point.

The point detection module 1114 outputs a position of the cluster (e.g., center coordinate of the cluster) at step 912 based on a calculated average of the LiDAR data points within the selected cluster. If there is a cluster present within the ranges defined in an appropriate step 806, 808, 810, 812, 814, or 816, then an object is detected by the point detection module 1114. The suspended load detection module 1112 utilizes the detected objects to further identify the object as a front plate 410 of crane 400, a rear plate 410 of crane 400, or a suspended load 440 as previously discussed in FIGS. 8A-8B.

Figure 10:
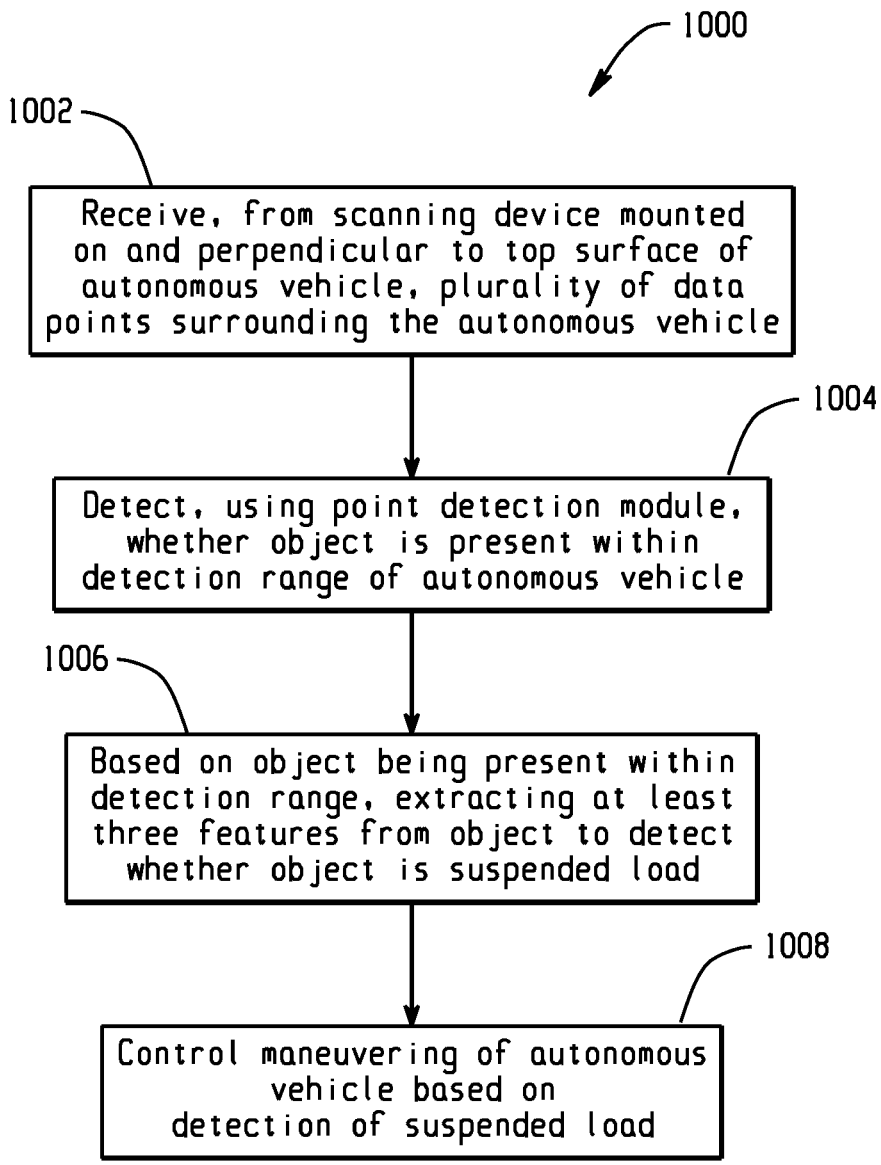
FIG. 10 is a process flow diagram illustrating a method for detecting a suspended object by an autonomous vehicle in accordance with various embodiments of the present disclosure.

FIG. 10 is a process flow diagram 1000 illustrating a method of detecting a suspended load by an autonomous vehicle maneuvering about an environment in accordance with various embodiments of the present disclosure. A plurality of data points surrounding the autonomous vehicle 230 are received, at step 1002, from at least one scanning device 610 mounted on and perpendicular to a top surface 620 of the autonomous vehicle 300. A point detection module 1114 detects, at step 1104, whether an object is present within a detection range 232 of the autonomous vehicle 220 by: clustering subsets of the plurality of data points and determining whether at least one clustered subset of the plurality of data points is within the detection range 232. Based on the object being present within the detection range 232, extracting, at step 1006, at least three features (e.g., first feature such as the plate of crane 210, second feature such as rear plate of crane 210, and third feature such as suspended load 220 between plates of crane 210) from the object to detect whether the object is a suspended load 220. The maneuvering of the autonomous vehicle is controlled, at step 1008, based on detection of the suspended load 220.

FIG. 11 illustrates an example suspended load detection system 1100 that processes input data 1120 and generates output data 1130 in accordance with various embodiments of the present disclosure. The input data 1120 can be, for example, the LiDAR data points generated by any of the LiDAR scanning devices 512, 514, 516, 518. The suspended load detection system 1100 includes one or more processing systems 810. Processing system 1110 includes a suspended load detection module 1112, a point detection module 1114, and data storage component 1116. The input data 1120 may be received by the processing system 1110 via a communications network, e.g., an Internet, an intranet, an extranet, a local area network ("LAN"), a wide area network ("WAN"), a metropolitan area network ("MAN"), a virtual local area network ("VLAN"), and/or any other network. The input data 1120 may also be received via a wireless, a wired, and/or any other type of connection. The input data 1120 is processed by the suspended load detection module 1112 and/or the point detection module utilizing the algorithms described in detail in FIGS. 8-9.

Processing system 1110 may be implemented using software, hardware and/or any combination of both. Processing system 1110 may also be implemented in a personal computer, a laptop, a server, a mobile telephone, a smartphone, a tablet, cloud, and/or any other type of device and/or any combination of devices. The suspended load detection module 1112 and/or the point detection module may perform execution, compilation, and/or any other functions on the input data 1120 as discussed in detail in FIGS. 8-9.

The data storage component 1116 may be used for storage of data processed by processing system 1110 and may include any type of memory (e.g., a temporary memory, a permanent memory, and/or the like).

Output data 1130 can include any data generated by the suspended load detection module 1112 and/or the point detection module 1114 such as identification of point clusters for left points or right points or an indication that there is a suspended load present within the detection range of the autonomous vehicle or within a stopping distance. Output data 1130 can also include an alert that a suspended load is detected, an indication to stop the autonomous vehicle, any data stored within data storage component 1116, or the like.

Figure 12:
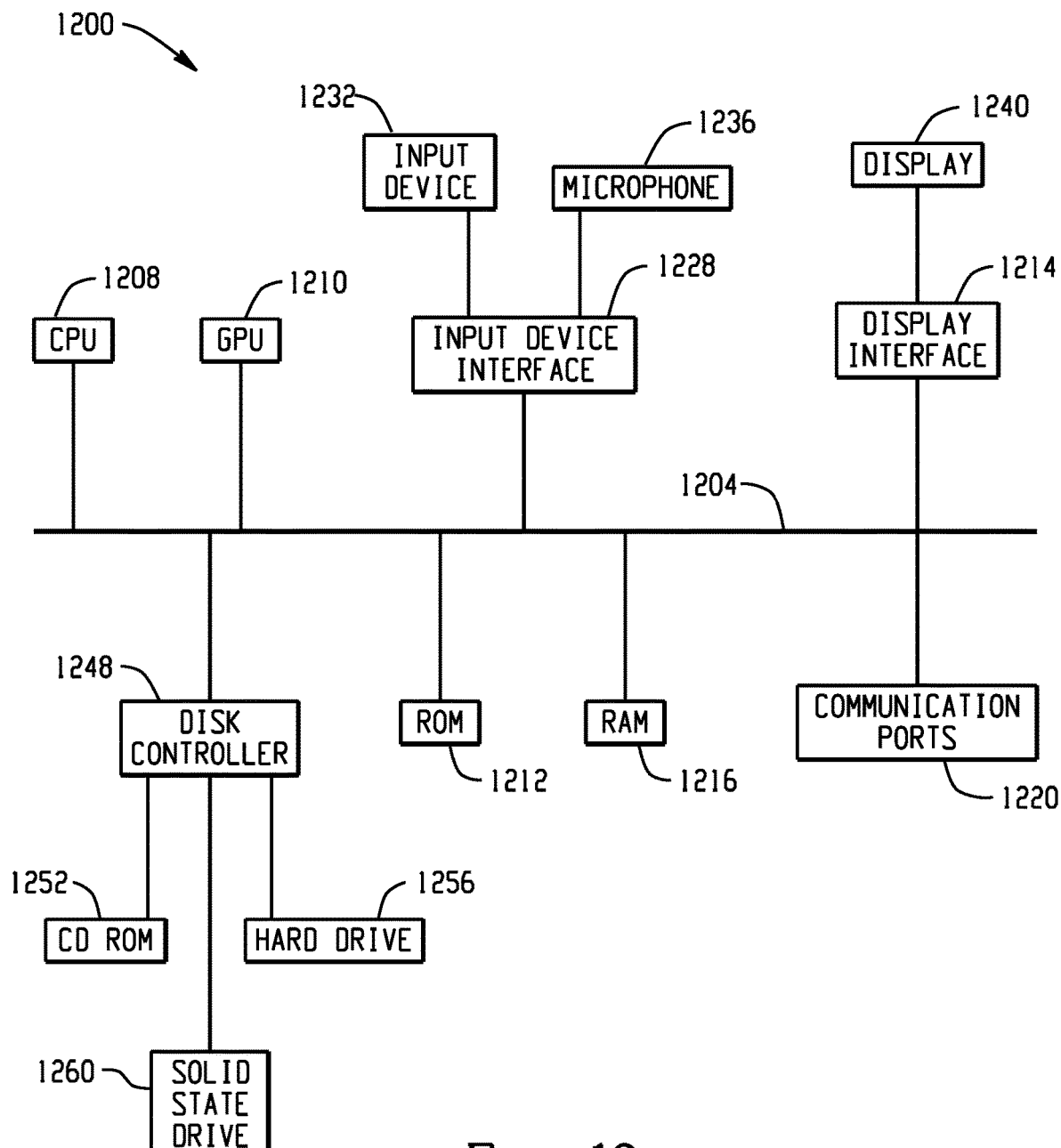
FIG. 12 is a diagram illustrating a sample computing device architecture for implementing various aspects described herein in which certain components can be omitted depending on the application.

FIG. 12 is a diagram 1200 illustrating a sample computing device architecture for implementing various aspects described herein in which certain components can be omitted depending on the application. A bus 1204 can serve as the information highway interconnecting the other illustrated components of the hardware. A processing system 1208 labeled CPU (central processing unit) (e.g., one or more computer processors/data processors at a given computer or at multiple computers) and/or a GPU-based processing system 1210 can perform calculations and logic operations required to execute a program. A non-transitory processor-readable storage medium, such as read only memory (ROM) 1212 and random access memory (RAM) 1216, can be in communication with the processing system 1208 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1248 can interface with one or more optional disk drives to the system bus 1204. These disk drives can be external or internal floppy disk drives such as 1260, external or internal CD-ROM, CD-R, CD-RW or DVD, or solid state drives such as 1252, or external or internal hard drives 1256. As indicated previously, these various disk drives 1252, 1256, 1260 and disk controllers are optional devices. The system bus 1204 can also include at least one communication port 1220 to allow for communication with external devices either physically connected to the computing system or available externally through a wired or wireless network. In some cases, the at least one communication port 1220 includes or otherwise comprises a network interface.

To provide for interaction with a user, the subject matter described herein can be implemented on a computing device having a display device 1240 (e.g., a CRT (cathode ray tube) or LCD (liquid crystal display) monitor) for displaying information obtained from the bus 1204 via a display interface 1214 to the user and an input device 1232 such as keyboard and/or a pointing device (e.g., a mouse or a trackball) and/or a touchscreen by which the user can provide input to the computer. Other kinds of input devices 1232 can be used to provide for interaction with a user as well; for example, feedback provided to the user can be any form of sensory feedback (e.g., visual feedback, auditory feedback by way of a microphone 1236, or tactile feedback); and input from the user can be received in any form, including acoustic, speech, or tactile input. The input device 1232 and the microphone 1236 can be coupled to and convey information via the bus 1204 by way of an input device interface 1228. Other computing devices, such as dedicated servers, can omit one or more of the display 1240 and display interface 1214, the input device 1232, the microphone 1236, and input device interface 1228.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the examples, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the examples is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for detecting a suspended load by an autonomous vehicle maneuvering about an environment, the method comprising:
    receiving, from a scanning device mounted on and perpendicular to a top surface of the autonomous vehicle, a plurality of data points surrounding the autonomous vehicle;
    filtering the plurality of data points to remove any data points that fall within a predetermined region of the environment so as to exclude load stacks;
    detecting, using a point detection module, whether an object is present within a detection range of the autonomous vehicle by:
        clustering subsets of the plurality of data points; and
        determining whether at least one clustered subset of the plurality of data points is within the detection range;
    based on the object being present within the detection range, extracting, by a suspended load detection module, at least three features from the object to detect whether the object is a suspended load; and
    controlling maneuvering of the autonomous vehicle based on detection of the suspended load.

2. The method of claim 1, wherein the controlling comprises halting maneuvering of the autonomous vehicle when (i) the object is detected as the suspended load and (ii) the autonomous vehicle is within a predetermined range of the suspended load.

3. The method of claim 1, wherein the extracting comprises:
    identifying a first portion of the plurality of data points that are present to either the left or the right of a center line of the autonomous vehicle;
    determining whether any of data points in the first portion are within (i) a first predetermined distance in front of the autonomous vehicle and (ii) a first predetermined height range,
    wherein a first feature of the at least three features is identified based on presence of any data point of the first portion within the first predetermined distance and the predetermined height range, and
    wherein the determining is repeated for a second portion of the plurality of data points that are present on an opposite side of the center line than the first portion based on none of the data points in the first portion being within the first predetermined distance and the first predetermined height range.

4. The method of claim 3, wherein based on the first feature being detected the extracting further comprises:
determining whether any of data points in the first portion are within a second predetermined distance in front of the autonomous vehicle that is behind the first feature,
wherein a second feature of the object is identified based on presence of any data point of the first portion within the second predetermined distance.

5. The method of claim 4, wherein based on the second feature being detected the extracting further comprises:
determining whether any of data points in the first portion are within a second predetermined height range,
wherein the object is identified as the suspended load positioned between the first feature and the second feature based on presence of any data point of the first portion within the second predetermined height range.

6. The method of claim 5, wherein based on none of the data points in the first portion being within the second predetermined distance or the second predetermined height range, the detecting presence of the object further comprises:
determining whether any of data points in a second portion are within (i) the first predetermined distance in front of the autonomous vehicle and (ii) the first predetermined height range,
wherein the first feature of the object is identified based on presence of any data point of the second portion within the first predetermined distance and the predetermined height range, and
wherein the second portion of the plurality of data points comprises data points that are present on an opposite side of the center line than the first portion.

7. The method of claim 1, wherein when the plurality of data points are not within the detection range, the controlling comprises maintaining the maneuvering of the autonomous vehicle.

8. The method of claim 1, wherein the scanning device is a light and detection ranging (LiDAR) device and the plurality of data points comprises a plurality of LiDAR data points.

9. The method of claim 1, wherein the clustering further comprises:
identifying a subset of the plurality of data points located within a designated region;
determining whether the subset is greater than a threshold value; and
based on the subset being greater than the threshold value, generating a plurality of clusters among the subset based on distances between each data point.

10. The method of claim 9, wherein coordinates of the plurality of clusters are provided by the point detection modules to the suspended load detection module.

11. The method of claim 1, wherein the autonomous vehicle is an autonomous prime mover and the environment is a shipping port environment.

12. A system detecting a suspended load by an autonomous vehicle maneuvering about an environment, the system comprising:
at least one data processor; and
memory storing instructions, which when executed by at least one data processor, result in operations for implementing operations comprising:
receiving, from a scanning device mounted on and perpendicular to a top surface of the autonomous vehicle, a plurality of data points surrounding the autonomous vehicle;
filtering the plurality of data points to remove any data points that fall within a predetermined region of the environment so as to exclude load stacks;
detecting, using a point detection module, whether an object is present within a detection range of the autonomous vehicle by:
clustering subsets of the plurality of data points;
determining whether at least one clustered subset of the plurality of data points is within the detection range;
based on the object being present within the detection range, extracting, by a suspended load detection module, at least three features from the object to detect whether the object is a suspended load; and
controlling maneuvering of the autonomous vehicle based on detection of the suspended load.

13. The system of claim 12, wherein the controlling comprises halting maneuvering of the autonomous vehicle when (i) the object is detected as the suspended load and (ii) the autonomous vehicle is within a predetermined range of the suspended load.

14. The system of claim 12, wherein the extracting comprises:
identifying a first portion of the plurality of data points that are present to either the left or the right of a center line of the autonomous vehicle;
determining whether any of data points in the first portion are within (i) a first predetermined distance in front of the autonomous vehicle and (ii) a first predetermined height range,
wherein a first feature of the object is identified based on presence of any data point of the first portion within the first predetermined distance and the predetermined height range, and
wherein the determining is repeated for a second portion of the plurality of data points that are present on an opposite side of the center line than the first portion based on none of the data points in the first portion being within the first predetermined distance and the first predetermined height range.

15. The system of claim 14, wherein based on the first feature being detected the extracting further comprises:
determining whether any of data points in the first portion are within a second predetermined distance in front of the autonomous vehicle that is behind the first feature,
wherein a second feature of the object is identified based on presence of any data point of the first portion within the second predetermined distance.

16. The system of claim 15, wherein based on the second feature detected the extracting further comprises:
determining whether any of data points in the first portion are within a second predetermined height range,
wherein the object is identified as the suspended load positioned between the first feature and the second feature based on presence of any data point of the first portion within the second predetermined height range.

17. The system of claim 16, wherein based on none of the data points in the first portion being within the second predetermined distance or the second predetermined height range, the detecting presence of the object further comprises:
determining whether any of data points in a second portion are within (i) the first predetermined distance in front of the autonomous vehicle and (ii) the first predetermined height range, wherein the first feature of the object is identified based on presence of any data point of the second portion within the first predetermined distance and the predetermined height range, and wherein the second portion of the plurality of data points comprises data points that are present on an opposite side of the center line than the first portion.

18. The system of claim 12, wherein when the plurality of data points are not within the detection range, the controlling comprises maintaining the maneuvering of the autonomous vehicle.

19. The system of claim 12, wherein the scanning device is a light and detection ranging (LiDAR) device and the plurality of data points comprises a plurality of LiDAR data points.

20. The system of claim 12, wherein the clustering further comprises:
identifying a subset of the plurality of data points located within a designated region;
determining whether the subset is greater than a threshold value; and
based on the subset being greater than the threshold value, generating a plurality of clusters among the subset based on distances between each data point.

21. The system of claim 20, wherein coordinates of the plurality of clusters are provided by the point detection modules to the suspended load detection module.

22. The system of claim 12, wherein the autonomous vehicle is an autonomous prime mover and the environment is a shipping port environment.

23. A non-transitory computer program product detecting a suspended load by an autonomous vehicle maneuvering about an environment, the non-transitory computer program product storing instructions which, when executed by at least one data processor forming part of at least one computing device, implement operations comprising:
receiving, from a scanning device mounted on and perpendicular to a top surface of the autonomous vehicle, a plurality of data points surrounding the autonomous vehicle;
filtering the plurality of data points to remove any data points that fall within a predetermined region of the environment;
detecting, using a point detection module, whether an object is present within a detection range of the autonomous vehicle by:
clustering subsets of the plurality of data points;
determining whether at least one clustered subset of the plurality of data points is within the detection range;
based on the object being present within the detection range, extracting at least three features from the object to detect whether the object is a suspended load; and
controlling maneuvering of the autonomous vehicle based on detection of the suspended load.

* * * * *